US011954939B2

(12) United States Patent
Chen et al.

(10) Patent No.: US 11,954,939 B2
(45) Date of Patent: Apr. 9, 2024

(54) ELECTRONIC DEVICE WITH OPTICAL SENSOR MODULE

(71) Applicant: 3M INNOVATIVE PROPERTIES COMPANY, St. Paul, MN (US)

(72) Inventors: Jingfei Chen, Shanghai (CN); Huijie Xie, Beijing (CN); Fan Long, Guangzhou (CN); Yan Yan Zhang, Shanghai (CN); Zhe Hu, Suzhou (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/017,151

(22) PCT Filed: Jul. 23, 2020

(86) PCT No.: PCT/CN2020/103761
§ 371 (c)(1),
(2) Date: Jan. 20, 2023

(87) PCT Pub. No.: WO2022/016445
PCT Pub. Date: Jan. 27, 2022

(65) Prior Publication Data
US 2023/0267761 A1 Aug. 24, 2023

(51) Int. Cl.
*G06V 40/13* (2022.01)
*G02F 1/1333* (2006.01)
(Continued)

(52) U.S. Cl.
CPC ...... *G06V 40/1318* (2022.01); *G02F 1/13338* (2013.01); *G06V 40/1324* (2022.01); *G06V 40/1341* (2022.01); *H04M 1/0266* (2013.01)

(58) Field of Classification Search
CPC .............. G06V 40/1318; G06K 9/0004; H01L 27/3234; H01L 27/3227; H01L 25/167
See application file for complete search history.

(56) References Cited

U.S. PATENT DOCUMENTS 11,288,483 B2    3/2022   Wang et al.
2017/0045396 A1*  2/2017   Hsu ................. G01S 7/4816
(Continued)

FOREIGN PATENT DOCUMENTS

CN    107832752 A    3/2018
CN    109791613 A    5/2019
(Continued)

OTHER PUBLICATIONS

International Search Report received for PCT International Application No. PCT/CN2020/103761, mailed on Apr. 20, 2021, 5 pages.

*Primary Examiner* — Yuzhen Shen
(74) *Attorney, Agent, or Firm* — Robert S. Moshrefzadeh

(57) ABSTRACT

An electronic device (200) includes a liquid crystal display (LCD) panel (204), a cover layer (218), one or more light sources (224), and an optical sensor module (226). The LCD panel (204) receives a contact input associated with a fingerprint of a user. The cover layer (218) includes a first major surface (228) and a second major surface (230) opposite to the first major surface (228), and is disposed on the LCD panel (204). The cover layer (218) defines a first axis (AA') normal to the first major surface (228). The optical sensor module (226) receives a light from the predetermined fingerprint sensing area (222) to detect the fingerprint. The optical sensor module (226) at least partially overlaps with the predetermined fingerprint sensing area (222) along the plane of the first major surface (228). The optical sensor module (226) defines a second axis (BB') normal to a surface of the optical sensor module (226). The second axis (BB') is inclined at an inclination angle relative to the first axis (AA') of the cover layer (218).

14 Claims, 5 Drawing Sheets

(51) Int. Cl.
*G06V 40/12* (2022.01)
*H04M 1/02* (2006.01)

(56) References Cited

U.S. PATENT DOCUMENTS

| | | | |
|---|---|---|---|
| 2017/0046558 A1 | 2/2017 | Li et al. | |
| 2017/0308731 A1 | 10/2017 | Evans et al. | |
| 2019/0080140 A1* | 3/2019 | Lee .................... | G06V 40/1318 |
| 2021/0150178 A1* | 5/2021 | Wang ................. | G06V 40/1388 |

FOREIGN PATENT DOCUMENTS

| | | | | |
|---|---|---|---|---|
| CN | 208888833 U | | 5/2019 | |
| CN | 209486694 U | | 10/2019 | |
| CN | 110596931 A | | 12/2019 | |
| CN | 110619305 A | * | 12/2019 | ......... G02F 1/13338 |
| CN | 110945527 A | * | 3/2020 | ......... G06V 40/1318 |
| CN | 110945527 A | | 3/2020 | |
| CN | 112800808 A | * | 5/2021 | ......... G06V 40/1318 |
| CN | 113361298 A | * | 9/2021 | ............. G06F 21/32 |
| JP | 2000259821 A | | 9/2000 | |
| WO | 2005078660 A1 | | 8/2005 | |
| WO | WO-2021051737 A1 | * | 3/2021 | ....... G02F 1/133606 |

\* cited by examiner

ELECTRONIC DEVICE WITH OPTICAL SENSOR MODULE

CROSS REFERENCE TO RELATED APPLICATIONS

This application is a national stage filing under 35 U.S.C. 371 of PCT/CN2020/103761 filed Jul. 23, 2020, the disclosure of which is incorporated by reference in its entirety herein.

TECHNICAL FIELD

The present disclosure relates generally to electronic devices having an optical sensor module to detect fingerprints of a user.

BACKGROUND

Electronic devices including portable or mobile computing devices, such as laptops, tablets, smartphones and wearable devices, store or have access to various types of personal and confidential information. Electronic devices typically include various security features to restrict unauthorized access to the electronic device, thereby maintaining the security of such information.

Fingerprint sensing is one of the biometric authentication systems for securely accessing an electronic device. In some cases, the electronic device is provided with a separate fingerprint sensor for capturing the user's fingerprints and unlocking the electronic device when the captured fingerprints match with those of the authorized users. In some other cases, electronic devices can include on-display fingerprint sensing that involve capturing fingerprint information from a finger placed on a display panel of the electronic devices. On-display fingerprint sensing generally includes an optical sensor to detect the light reflected from the finger placed on a viewing surface of the display panel.

SUMMARY

Generally, the present disclosure relates to electronic devices having an optical sensor module to detect fingerprints of a user. The present disclosure may also relate to electronic devices with more accurate and reliable fingerprint sensing capabilities.

In one embodiment of the present disclosure, an electronic device includes a liquid crystal display (LCD) panel for receiving a contact input associated with a fingerprint of a user. The electronic device further includes a cover layer including a first major surface defining a plane, and a second major surface opposite to the first major surface and disposed on the LCD panel. The first major surface includes a predetermined fingerprint sensing area for being touched by the user. The cover layer defines a first axis normal to the first major surface. The electronic device further includes one or more light sources configured to produce an illuminating light that passes through the LCD panel to illuminate the predetermined fingerprint sensing area. The electronic device further includes an optical sensor module for receiving a light from the predetermined fingerprint sensing area to detect the fingerprint. The optical sensor module at least partially overlaps with the predetermined fingerprint sensing area along the plane of the first major surface. The optical sensor module defines a second axis normal to a surface of the optical sensor module. The second axis is inclined at an inclination angle relative to the first axis of the cover layer.

BRIEF DESCRIPTION OF THE DRAWINGS

The disclosure may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

On-display fingerprint sensing typically includes an optical sensor to detect light reflected from a finger placed on a viewing surface of a display panel. However, the reflected light may be redirected by one or more layers of the display panel resulting in a partial or an inaccurate detection of fingerprints by the optical sensor. According to some embodiments of the present disclosure, electronic devices are provided that have more accurate and reliable fingerprint sensing capabilities than conventional devices.

The present disclosure relates to an electronic device having an optical sensor module to detect fingerprints of a user. The electronic device includes a liquid crystal display (LCD) panel and a cover layer disposed on the LCD panel. The optical sensor module is positioned according to one or more positioning configurations to capture the fingerprint information. In one configuration, the optical sensor module may be positioned at an inclination angle relative to a first axis of a cover layer. The optical sensor module, in appropriate positioning configuration(s), may be able to capture fingerprint information more accurately and reliably.

Figure 1:
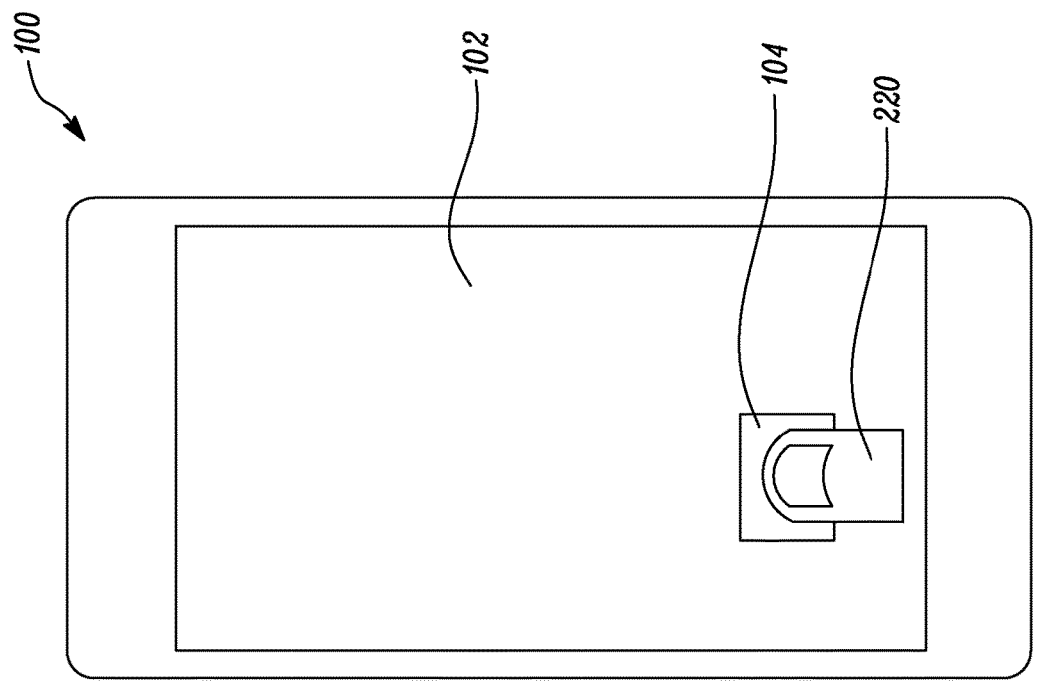
FIG. 1 schematically illustrates an exemplary implementation of an electronic device.

FIG. 1 illustrates an exemplary implementation of an electronic device 100. The electronic device 100 defines mutually orthogonal X, Y, and Z-axes. The X and Y-axes are in-plane axes of the electronic device 100, while the Z-axis is a transverse axis disposed along a thickness of the electronic device 100. In other words, the X and Y-axes are disposed along a plane of the electronic device 100, while the Z-axis is perpendicular to the plane of the electronic device 100.

The electronic device 100 includes a display screen 102 configured to display content, such as text and graphics. In some embodiments, the display screen 102 may be, partly or entirely, a touch sensitive screen to provide a touch sensing user interface for operating the electronic device 100.

Accordingly, the display screen 102 may receive touch inputs from a user. The display screen 102 may be implemented by an LCD screen, an organic light emitting diode (OLED) display screen, an active matrix organic light emitting diode (AMOLED) display screen, or an electroluminescent display screen.

The electronic device 100 may have optical sensing capabilities for providing secure access to the user by imaging biometrics of the user. In one embodiment, the electronic device 100 may have an infrared (IR) camera to capture fingerprints of the user. Such access mechanisms protect information stored locally on, or accessible by, the electronic device 100. Examples of such electronic devices 100 include mobile phones, tablet computers, wrist-worn devices, gaming devices, digital broadcast terminals, messaging devices, personal digital assistants, other wearable or portable devices, desktop computers, kiosks, and the like.

As shown in FIG. 1, the electronic device 100 includes a fingerprint sensing area 104 on the display screen 102 for capturing fingerprints of the user. The fingerprint sensing area 104 may be touched by a finger 220 of the user. The remaining portion of the display screen 102 apart from the fingerprint sensing area 104 may or may not be touch-sensitive. The fingerprint sensing area 104 may be illuminated as a visibly identifiable area, for a user to place the finger 220 for fingerprint sensing. The fingerprint sensing area 104 may function like the rest of the display screen 102 when not being used as the fingerprint sensing area 104. In one embodiment, the fingerprint sensing area 104 may have a predetermined shape and size. Referring to the example implementation of FIG. 1, the fingerprint sensing area 104 is rectangular in shape. In one embodiment, the electronic device 100 includes multiple fingerprint sensing areas 104 on the display screen 102. Furthermore, in some embodiments, the fingerprint sensing area 104 may be designed to cover the entire display screen 102.

When the finger 220 of the user touches a top surface of the display screen 102, the finger 220 may interact with light at the top surface to cause the reflected or scattered light to carry spatial image information of the finger 220. The reflected light is then received by an optical sensor module disposed within the electronic device 100 to capture a fingerprint image of the user. The fingerprint image may be compared against a database of registered fingerprint images for identification and authentication of the user.

Figure 2:
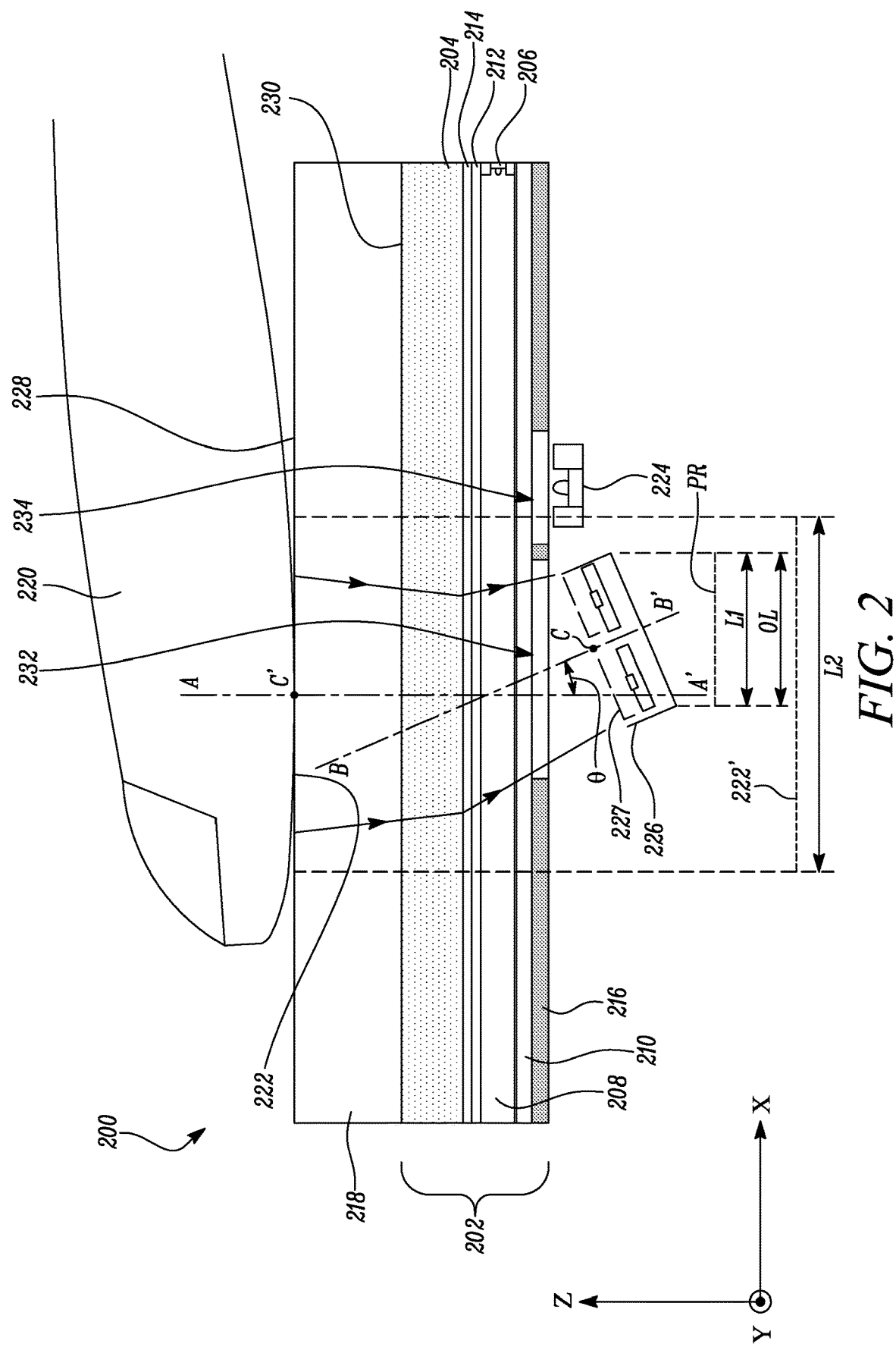
FIG. 2 schematically illustrates an exemplary position of an optical sensor module of the electronic device.

FIG. 2 illustrates a schematic view of an exemplary implementation of an electronic device 200. In some embodiments, the electronic device 200 is a mobile phone. The electronic device 200 includes an LCD module 202 having one or more layers. The LCD module 202 includes an LCD panel 204 for receiving a contact input associated with a fingerprint of the user. The LCD panel 204 includes a layer of liquid crystals that are selectively activated by a controller (not shown), such that the images, graphics, text, etc., are viewable to the user. The LCD panel 204 may be a touch sensitive display panel configured to receive contact inputs from the user for the operation of the electronic device 200.

The LCD panel 204 is illuminated by light generated by a backlight source 206. In some embodiments, the electronic device 200 includes a plurality of the backlight sources 206. Some examples of the backlight sources 206 include a fluorescent lamp, one or more light-emitting diodes (LEDs), or a combination thereof. The backlight source 206 may be arranged in an edge-lit backlighting configuration (e.g., as shown in FIG. 2) or a direct-lit backlighting configuration.

In one embodiment, the LCD module 202 includes a light guide 208 to guide the light generated by the backlight source 206. As shown in FIG. 2, the light guide 208 is disposed below the LCD panel 204. The light guide 208 may be a clear, solid, and relatively thin plate whose length and width dimensions are designed based on a coverage of light output from the backlight source 206. The light guide 208 uses total internal reflection to transport or guide light from the backlight source 206 across the entire length or width of the light guide 208. The light guide 208 may be formed from a polymerizable material, such as an acrylate, silicone, or urethane material.

In one embodiment, the LCD module 202 includes an optical reflector film layer 210 underneath the light guide 208 to reflect the unused light back to the various layers of the LCD module 202. Thus, the optical reflector film layer 210 recycles light generated by the backlight source 206. This may result in improved light use efficiency and increased brightness.

In one embodiment, the LCD module 202 includes a diffuser layer 212 disposed between the LCD panel 204 and the light guide 208 for substantially uniform distribution of light to the LCD panel 204. Specifically, the diffuser layer 212 may spatially spread the light received from the light guide 208 for illuminating the liquid crystals in the LCD panel 204. The diffuser layer 212 may include a diffuser film or plate made of any suitable diffusing material or materials. In some embodiments, the diffuser layer 212 may include a polymeric matrix of polymethyl methacrylate (PMMA) with a variety of dispersed phases that include glass, polystyrene beads, and CaCO3 particles. Examples of the diffuser layer 212 can include 3M™ Scotchcal™ Diffuser Film, types 3635-30, 3635-70, 3635-100, 3735-50, and 3735-60 available from 3M Company, St. Paul, Minnesota.

Referring to FIG. 2, the LCD module 202 includes a prism layer 214 disposed below the LCD panel 204. Specifically, the prism layer 214 is disposed between the diffuser layer 212 and the LCD panel 204. The prism layer 214 may have a planar surface and a structured surface including a plurality of prisms. The prisms form inclined ridges on the structured surface of the prism layer 214. Depending on an incident angle of light received from the diffuser layer 212, the light may either pass through the prism layer 214 to the LCD panel 204 or the light is reflected back to the diffuser layer 212. The reflected light may further pass through the light guide 208 to reach the optical reflector film layer 210 where it is recycled. The electronic device 200 may also include other layers, such as color filter layers and polarizer layers. Referring to FIG. 2, the LCD module 202 has a frame 216 that serves as a housing for various layers of the LCD module 202. The frame 216 may have a structure suitable to allow the electronic device 200 to have fingerprint sensing capability. For example, the frame 216 may include multiple openings.

The electronic device 200 further includes a cover layer 218. The cover layer 218 includes a first major surface 228 defining a plane and a second major surface 230 opposite to the first major surface 228. The plane may be defined in the X-Y plane. Furthermore, the cover layer 218 is disposed on the LCD panel 204. Specifically, the second major surface 230 of the cover layer 218 is disposed on the LCD panel 204. The first major surface 228 includes a predetermined fingerprint sensing area 222 for being touched by the user. The fingerprint sensing area 222 may be similar to the fingerprint sensing area 104 shown in FIG. 1. The cover layer 218 defines a first axis AA' normal to the first major surface 228. In the illustrated embodiment, the first axis AA' passes through a center C' of the predetermined fingerprint sensing area 222. The cover layer 218 may provide protection to the various components within the electronic device 200. The cover layer 218 may be substantially, or entirely transparent and may be composed of glass, plastic, or a composite thereof, or any other suitable material (e.g., crystallized aluminum oxide).

The electronic device 200 further includes one or more light sources 224 to produce an illuminating light that passes through the LCD panel 204 to illuminate the predetermined fingerprint sensing area 222. The optical wavelength of such light sources 224 can be selected to meet the optical sensing requirements. In one embodiment, the one or more light sources 224 are configured to emit infrared light having optical wavelength from about 700 nm to about 1000 nm. The light sources 224 may be provided at suitable positions so that light beam or a portion of light beam may be projected onto the fingerprint sensing area 222 at desired angles. The illuminating light from the light sources 224 interacts with the finger 220 placed in the predetermined fingerprint sensing area 222 on the cover layer 218 to generate reflected light carrying the fingerprint pattern or information. In one embodiment, the light sources 224 include a light emitting diode or a laser diode. The illuminating light from the light sources 224 may be modulated to improve the optical sensing detection.

The electronic device 200 further includes an optical sensor module 226 configured to receive light that passes through the LCD panel 204 to detect the fingerprint. Specifically, the optical sensor module 226 receives a light from the predetermined fingerprint sensing area 222 to detect the fingerprint. Furthermore, the optical sensor module 226 defines a second axis BB' normal to a surface 227 of the optical sensor module 226. In the illustrated embodiment, the second axis BB' passes through a center C of the surface 227 of the optical sensor module 226. The surface 227 of the optical sensor module 226 defining the center C may be an input surface of the optical sensor module 226. The surface 227 may receive the light from the predetermined fingerprint sensing area 222.

Referring to FIG. 2, the diffuser layer 212 is disposed between the LCD panel 204 and the optical sensor module 226. Furthermore, the prism layer 214 is disposed between the LCD panel 204 and the optical sensor module 226, such that the light received by the optical sensor module 226 passes through the prism layer 214.

When the finger 220 touches the fingerprint sensing area 222 of the first major surface 228 of the cover layer 218, a portion of the light from the light sources 224 is reflected by the finger 220 and the reflected light carries the fingerprint information. In one embodiment, the optical sensor module 226 includes a photodiode array. The photodiode array may be a complementary metal-oxide-semiconductor (CMOS) sensor, a charge coupled device (CCD) sensor array or a suitable optical sensor array that is sensitive to light. In some embodiments, the optical sensor module 226 includes an infrared light camera configured to capture infrared light.

The optical sensor module 226 may be positioned in one or more positioning configurations to optimally receive the light reflected from the finger 220. The reflected light may be redirected by one or more layers of the electronic device 200 before reaching the optical sensor module 226. For example, the prism layer 214 may redirect the reflected light. Accordingly, the optical sensor module 226 may be positioned to properly capture the reflected light.

As shown in FIG. 2, the optical sensor module 226 at least partially overlaps with the predetermined fingerprint sensing area 222 along the plane of the first major surface 228. In other words, the optical sensor module 226 at least partially overlaps with the predetermined fingerprint sensing area 222 along the X-Y plane. FIG. 2 shows a projection PR of the optical sensor module 226 onto the plane of the first major surface 228. In other words, the projection PR is a projection of the optical sensor module 226 in the X-Y plane. The projection PR has a length L1 along the X-axis. The predetermined fingerprint sensing area 222 has a length L2 along the X-axis. For illustrative purpose, a projection 222' of the predetermined fingerprint sensing area 222 is shown as having the length L2 along the X-axis. The projection 222' is along the plane of the first major surface 228, i.e., the X-Y plane. The projection 222' has dimensions identical to the predetermined fingerprint sensing area 222 as both are located in the X-Y plane. An overlap OL is illustrated between the projection PR of the optical sensor module 226 and the projection 222' of the predetermined fingerprint sensing area 222. The overlap OL corresponds to the overlap between the optical sensor module 226 and the predetermined fingerprint sensing area 222 along the plane of the first major surface 228. In some embodiments, the overlap OL is at least 10% of the length L1 of the projection PR of the optical sensor module 226. In some other embodiments, the overlap OL is at least 20%, at least 30%, at least 40%, at least 50%, at least 60%, at least 70%, at least 80%, at least 90%, or at least 95% of the length L1 of the projection PR. In the illustrated embodiment, the overlap OL is substantially equal to the length L1 of the projection PR, i.e., there is 100% overlap between the optical sensor module 226 and the predetermined fingerprint sensing area 222 along the plane of the first major surface 228. However, the overlap OL may be varied as per desired application attributes.

Furthermore, the second axis BB' is inclined at an inclination angle θ relative to the first axis AA' of the cover layer 218. In some embodiments, the inclination angle is from about 25 degrees to about 35 degrees. In some embodiments, the inclination angle is about 30 degrees.

The frame 216 is disposed between the LCD panel 204 and the optical sensor module 226. The frame 216 defines a first opening 232 therethrough aligned with the optical sensor module 226, such that the light received by the optical sensor module 226 passes through the first opening 232. Moreover, in the illustrated embodiment of FIG. 2, the frame 216 defines one or more second openings 234 therethrough aligned with the one or more light sources 224, such that the illuminating light from the one or more light sources 224 passes through the one or more second openings 234.

In this configuration, the optical sensor module 226 may capture more fingerprint information resulting in improved reliability and performance of the optical sensor module 226. The optical sensor module 226 may capture a better image having more fingerprint information. The optical sensor module 226 may provide enhanced optical sensing capabilities, such as faster and more accurate fingerprint sensing, thereby improving the overall user experience of the electronic device 200.

As shown in FIG. 2, the optical reflector film layer 210 is disposed between the LCD panel 204 and the optical sensor module 226. Furthermore, the light guide 208 is disposed between the LCD panel 204 and the optical sensor module 226. The presence of the optical reflector film layer 210 may block most of the light from reaching the optical sensor module 226, and thus can adversely affect the optical fingerprint sensing. The optical reflector film layer 210 may be modified in a way that maintains the desired optical reflection under the light guide 208 in most locations while allowing for desired optical transmission at the location of the optical sensor module 226. For example, the optical reflector film layer 210 may reflect light in a first wavelength range and transmit light in a second wavelength range. Light emitted by the backlight source 206 may lie in the first wavelength range, while light emitted by the one or more light sources 224 may lie in the second wavelength range.

Figure 3:
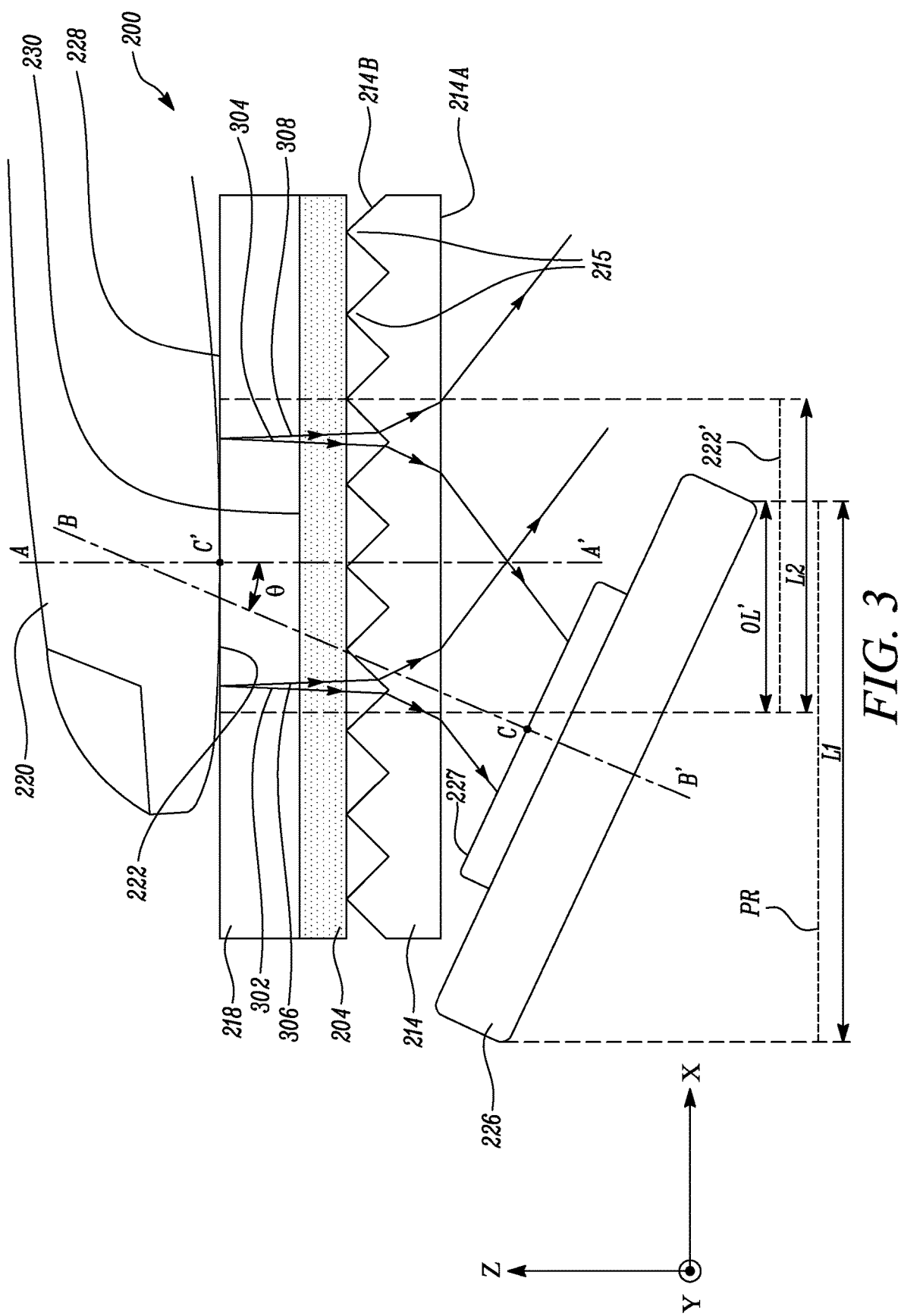
FIG. 3 schematically illustrates another exemplary position of the optical sensor module of the electronic device.

FIG. 3 illustrates another exemplary position of the optical sensor module 226 of the electronic device 200. Components that are common with FIG. 2 are illustrated by similar reference numerals. The optical sensor module 226 is configured to capture the light from the predetermined fingerprint sensing area 222 to detect the fingerprint. The electronic device 200 includes the prism layer 214. In the illustrated embodiment, the prism layer 214 includes a single prism film. In some other embodiments, the prism layer 214 includes multiple prism films. As shown in FIG. 3, the prism layer 214 includes a planar surface 214A and a structured surface 214B. The structured surface 214B includes a plurality of prisms 215 extending along a first direction and arranged along an orthogonal second direction. The first direction is defined along the Y-axis, while the second direction is defined along the X-axis.

The electronic device 200 may also include various other layers as described above with respect to FIG. 2, however some of these layers are not shown in FIG. 3 for the purpose of clarity.

Referring to FIG. 3, light rays 302, 306 are received from one point of the fingerprint sensing area 222. The light rays 302, 306 are refracted due to the prism layer 214. The light rays 302, 306 are finally captured by the optical sensor module 226. Similarly, light rays 304, 308 are received from another point of the fingerprint sensing area 222. The light rays 304, 308 are redirected by the prism layer 214 before being captured by the optical sensor module 226. An image having a substantially low fingerprint information of the fingerprint may be formed in a region in which the light rays 306, 304 overlap. Conventionally, the image having a substantially low fingerprint information may be captured by an optical sensor module. In order to avoid capturing the image having a substantially low fingerprint information by the optical sensor module 226, the second axis BB' of the optical sensor module 226 is inclined at the inclination angle θ with respect to the first axis AA' of the first major surface 228 of the cover layer 218. In some embodiments, the inclination angle θ is about 25 degrees to about 35 degrees. Therefore, by inclining the optical sensor module 226 at the inclination angle θ, the optical sensor module 226 may capture a better image having more fingerprint information. This may result in improved reliability and performance of the optical sensor module 226.

The inclination angle θ required for capturing the light rays 306, 308 may be same as or different from the inclination angle θ required for capturing the light rays 302, 304.

Furthermore, an overlap OL' is also provided between the optical sensor module 226 and the predetermined fingerprint sensing area 222 along the plane of the first major surface 228. The overlap OL' is shown between the projection PR of the optical sensor module 226 onto the plane (i.e., X-Y plane) of the first major surface 228 and the projection 222' of the predetermined fingerprint sensing area 222 onto the X-Y plane. In the illustrated embodiment of FIG. 3, the overlap OL' is less than 50% of the length L1 of the projection PR. However, the overlap OL' may be varied to improve the image captured by the optical sensor module 226.

Figure 4:
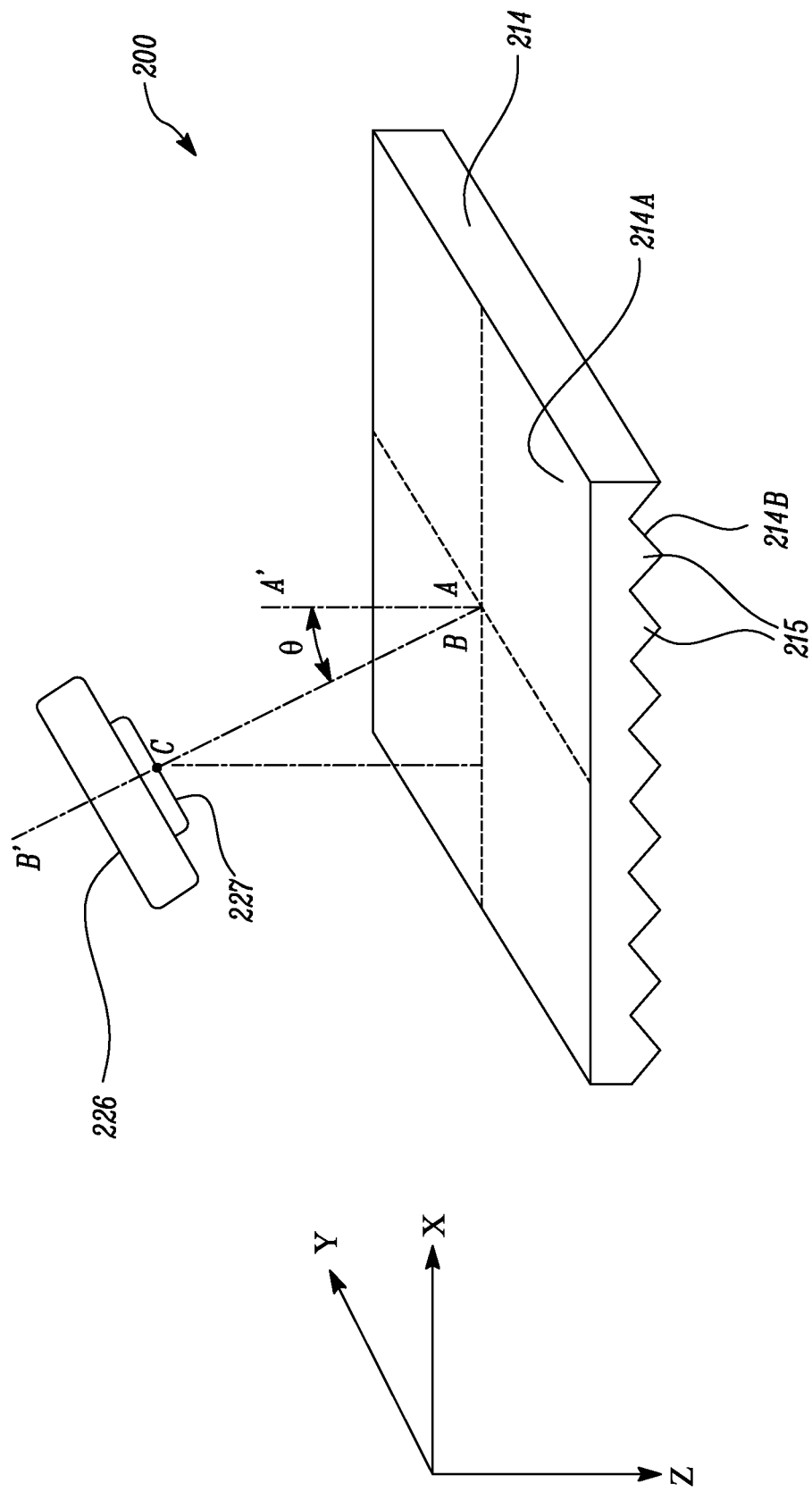
FIG. 4 schematically illustrates an exemplary position of the optical sensor module with a single prism film.

FIG. 4 shows a partial schematic view of the electronic device 200 illustrating an exemplary position of the optical sensor module 226 with respect to the prism layer 214. The optical sensor module 226 is shown above the prism layer 214 for illustrative purpose. In the illustrated embodiment of FIG. 4, the prism layer 214 includes a single prism film. Furthermore, the first axis AA' and the second axis BB' are shown. Various other layers as described with reference to FIG. 2 are not shown in FIG. 4 for the purpose of clarity.

Referring to FIG. 4, the prism layer 214 includes the single prism film. As discussed above, the prism layer 214 includes the planar surface 214A and the structured surface 214B. The planar surface 214A is positioned substantially along the X-Y plane. The structured surface 214B includes the plurality of prisms 215 extending along the first direction (i.e., Y-axis) and arranged along the second direction (i.e., X-axis). The optical sensor module 226 is oriented substantially perpendicular to the first direction along the planar surface 214A. In other words, the optical sensor module 226 is positioned substantially perpendicular to the Y-axis (e.g., the optical sensor module 226 can be positioned such that a projection of the second axis BB' of the optical sensor module 226 onto the X-Y plane is substantially perpendicular to the Y-axis). Furthermore, the second axis BB' of the optical sensor module 226 is inclined at the inclination angle θ with respect to the first axis AA' of the first major surface 228 of the cover layer 218 (shown in FIG. 2). The inclination angle θ is measured substantially along the X-Z plane. In some embodiments, the inclination angle θ is about 25 degrees to about 35 degrees. In the illustrated embodiment, the inclination angle θ is about 30 degrees.

As discussed above, this configuration may allow the optical sensor module 226 may capture a better image having more fingerprint information.

Figure 5:
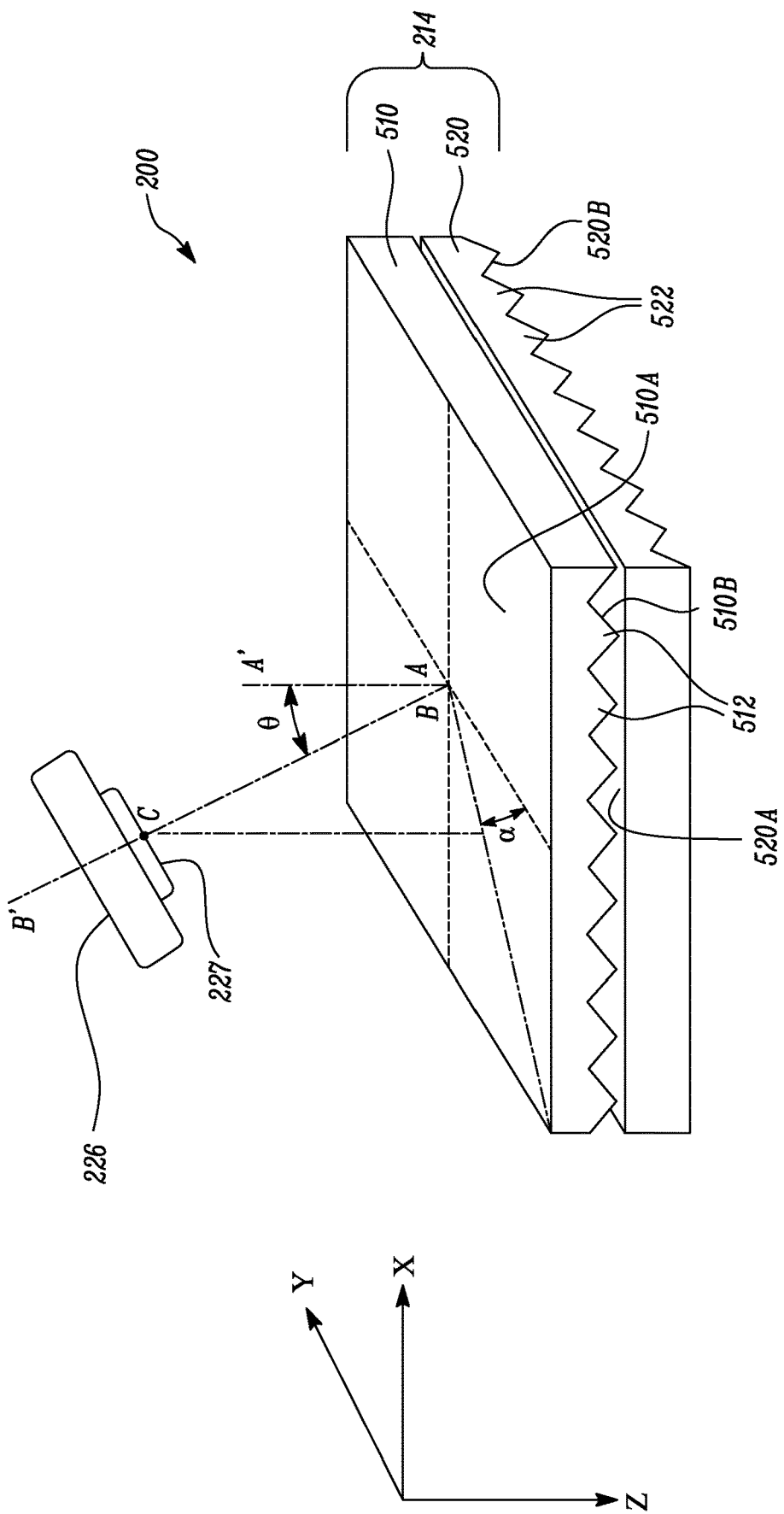
FIG. 5 schematically illustrates an exemplary position of the optical sensor module with two prism films.

FIG. 5 shows a partial schematic view of the electronic device 200 illustrating an exemplary position of the optical sensor module 226 with respect to the prism layer 214. The optical sensor module 226 is shown above the prism layer 214 for illustrative purpose. Furthermore, the first axis AA' and the second axis BB' are shown. Various other layers as described with reference to FIG. 2 are not shown in FIG. 5 for the purpose of clarity.

In the illustrated embodiment of FIG. 5, the prism layer 214 includes two prism films. Specifically, the prism layer 214 includes a first prism film 510 and a second prism film 520. In some embodiments, the first and second prism films 510, 520 may be in crossed configuration, which may further increase a brightness of the LCD panel 204 (shown in FIG. 2), thereby improving the user experience of the electronic device 200. The cross configuration of the first and second prism films 510, 520 may require a different configuration of the optical sensor module 226 than discussed above. In some other embodiments, the prism layer 214 may include more than two prism films, which may require different configurations of the optical sensor module 226.

As discussed, the first prism film 510 and the second prism film 520 are in the crossed configuration, i.e., the second prism film 520 may be rotated 90 degrees with respect to the first prism film 510 and about the Z-axis. The first prism film 510 includes a first planar surface 510A and a first structured surface 510B. The first planar surface 510A is positioned substantially along the X-Y plane. The first structured surface 510B includes a plurality of first prisms 512 extending along the first direction (i.e., Y-axis) and arranged along the second direction (i.e., X-axis). The second prism film 520 is disposed adjacent to the first prism film 510. The second prism film 520 includes a second planar surface 520A substantially parallel to the first planar surface 510A and a second structured surface 520B. The second structured surface 520B includes a plurality of second prisms 522 extending along the second direction and arranged along the first direction.

As discussed above, the optical sensor module 226 is inclined at the inclination angle θ. Specifically, the second axis BB' of the optical sensor module 226 is inclined at the inclination angle θ with respect to the first axis AA' of the first major surface 228 of the cover layer 218 (shown in FIG. 2). In some embodiments, the inclination angle θ is about 25 degrees to about 35 degrees. In the illustrated embodiment, the inclination angle θ is about 30 degrees. Furthermore, the optical sensor module 226 is inclined to the first direction by a plane angle α measured along the first planar surface 510A. In other words, the optical sensor module 226 is inclined to the Y-axis by the plane angle α measured along the X-Y plane (e.g., the plane angle α may be described as the angle between the Y-axis and a projection of the second axis BB' of the optical sensor module 226 onto the X-Y plane). The plane angle α is from about 40 degrees to about 50 degrees. In the illustrated embodiment, the plane angle α is about 45 degrees.

In the configuration shown in FIG. 5, the optical sensor module 226, when used with the prism layer 214 having the first and second prism films 510, 520, may capture more fingerprint information resulting in improved reliability and performance of the optical sensor module 226. The optical sensor module 226 may provide enhanced optical sensing capabilities, such as faster and more accurate fingerprint sensing, thereby improving the overall user experience of the electronic device 200.

The configurations of the optical sensor module, as described above in various embodiments, can be implemented to provide electronic devices with improved fingerprint sensing, especially for smartphones, tablets, and other electronic devices with LCD display screens to provide various on-display touch sensing operations and functions, and to enhance the user experience in such electronic devices.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An electronic device comprising:
a liquid crystal display (LCD) panel for receiving a contact input associated with a fingerprint of a user;
a cover layer comprising a first major surface defining a plane and a second major surface opposite to the first major surface and disposed on the LCD panel, the first major surface comprising a predetermined fingerprint sensing area for being touched by the user, wherein the cover layer defines a first axis normal to the first major surface;
one or more light sources configured to produce an illuminating light that passes through the LCD panel to illuminate the predetermined fingerprint sensing area;
an optical sensor module for receiving a light from the predetermined fingerprint sensing area to detect the fingerprint, wherein the optical sensor module at least partially overlaps with the predetermined fingerprint sensing area along the plane of the first major surface, the optical sensor module defining a second axis normal to a surface of the optical sensor module, wherein the second axis is inclined at an inclination angle relative to the first axis of the cover layer; and
a frame disposed between the LCD panel and the optical sensor module, wherein the frame defines a first opening therethrough aligned with the optical sensor module, such that the light received by the optical sensor module passes through the first opening;
wherein the frame further defines one or more second openings therethrough aligned with the one or more light sources, such that the illuminating light from the one or more light sources passes through the one or more second openings.

2. The electronic device of claim 1, wherein the inclination angle is from about 25 degrees to about 35 degrees.

3. The electronic device of claim 2, wherein the inclination angle is about 30 degrees.

4. The electronic device of claim 1, wherein the one or more light sources are configured to emit infrared light having optical wavelength from about 700 nm to about 1000 nm.

5. The electronic device of claim 1, wherein the one or more light sources include a light emitting diode or a laser diode.

6. The electronic device of claim 1, further comprising a diffuser layer disposed between the LCD panel and the optical sensor module.

7. The electronic device of claim 1, further comprising a prism layer disposed between the LCD panel and the optical sensor module, such that the light received by the optical sensor module passes through the prism layer.

8. The electronic device of claim 7, wherein the prism layer further comprises a planar surface and a structured surface comprising a plurality of prisms extending along a first direction and arranged along an orthogonal second direction, wherein the optical sensor module is oriented substantially perpendicular to the first direction along the planar surface.

9. The electronic device of claim 7, wherein the prism layer further comprises:
a first prism film comprising a first planar surface and a first structured surface comprising a plurality of first prisms extending along a first direction and arranged along an orthogonal second direction; and
a second prism film disposed adjacent to the first prism film, the second prism film comprising a second planar surface substantially parallel to the first planar surface and a second structured surface comprising a plurality of second prisms extending along the second direction and arranged along the first direction,
wherein the optical sensor module is inclined to the first direction by a plane angle measured along the first planar surface, and wherein the plane angle is from about 40 degrees to about 50 degrees.

10. The electronic device of claim 9, wherein the plane angle is about 45 degrees.

11. The electronic device of claim 1, wherein the optical sensor module includes a photodiode array and an infrared light camera.

12. The electronic device of claim 1, further comprising a light guide disposed between the LCD panel and the optical sensor module.

13. The electronic device of claim 1, further comprising an optical reflector film layer disposed between the LCD panel and the optical sensor module.

14. An electronic device comprising:
- a liquid crystal display (LCD) panel for receiving a contact input associated with a fingerprint of a user;
- a cover layer comprising a first major surface defining a plane, the cover layer disposed on the LCD panel as an interface for being touched by the user within a predetermined fingerprint sensing area, wherein a projection of the predetermined fingerprint sensing area onto the plane of the first major surface has a length L2 along an in-plane axis of the plane of the first major surface;
- one or more light sources for producing light that passes through the LCD panel to illuminate the predetermined fingerprint sensing area; and
- an optical sensor module for receiving light that passes through the LCD panel to detect the fingerprint, wherein a projection of the optical sensor module onto the plane of the first major surface has a length L1 along the in-plane axis of the plane of the first major surface, wherein L1<L2;
- wherein the optical sensor module is positioned in a plane which is inclined at an angle with respect to a horizontal plane of the LCD panel, and wherein the projection of the optical sensor module completely overlaps with the projection of the predetermined fingerprint sensing area, such that an overlap between the projection of the optical sensor module and the projection of the predetermined fingerprint sensing area is equal to the length L1.

* * * * *